United States Patent
Denda et al.

(10) Patent No.: US 9,022,544 B2
(45) Date of Patent: May 5, 2015

(54) INK JET RECORDING METHOD AND RECORDED MATTER

(71) Applicant: Seiko Epson Corporation, Tokyo (JP)

(72) Inventors: Atsushi Denda, Chino (JP); Maki Nariai, Shiojiri (JP); Naoki Koike, Matsumoto (JP); Takayoshi Kagata, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/066,994

(22) Filed: Oct. 30, 2013

(65) Prior Publication Data
US 2014/0127482 A1 May 8, 2014

(30) Foreign Application Priority Data
Nov. 7, 2012 (JP) .................................. 2012-245102

(51) Int. Cl.
*B41J 2/01* (2006.01)
*C09D 11/322* (2014.01)
*B41J 2/21* (2006.01)
*B41M 5/00* (2006.01)

(52) U.S. Cl.
CPC ............. *C09D 11/322* (2013.01); *B41J 2/2107* (2013.01); *B41M 5/0023* (2013.01)

(58) Field of Classification Search
CPC ............. B41M 5/0023; B41M 5/0011; B41M 5/0017; B41M 7/00; C09D 11/36; C09D 11/40; C09D 11/30; C09D 11/38; C09D 11/322; C09D 11/328; C09D 11/101; C09D 11/005; C09D 11/54; C09D 11/52; B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21
USPC .......... 347/100, 99, 96, 95, 88, 101, 102, 105, 347/21, 20, 9; 106/31.6, 31.13, 31.27; 523/160, 161
See application file for complete search history.

(56) References Cited

U.S. PATENT DOCUMENTS

| | | | |
|---|---|---|---|
| 7,846,246 B2 | 12/2010 | Oyanagi et al. | |
| 2008/0145628 A1 | 6/2008 | Oyanagi et al. | |
| 2010/0026771 A1* | 2/2010 | Mochizuki | 347/102 |
| 2010/0256284 A1 | 10/2010 | Kagata et al. | |

FOREIGN PATENT DOCUMENTS

| | | |
|---|---|---|
| JP | 2915874 B2 | 7/1999 |
| JP | 2002-088274 A | 3/2002 |
| JP | 2004-131542 A | 4/2004 |

(Continued)

*Primary Examiner* — Manish S Shah
(74) *Attorney, Agent, or Firm* — Harness, Dickey & Pierce, P.L.C.

(57) ABSTRACT

An ink jet recording method according to an aspect of this invention includes discharging an ink composition containing a metallic pigment to a recording medium using a recording head, and then recording a metallic image in a recording region of the recording medium, in which particles of the metallic pigment have a plate shape and have a coating layer on the surface, the average particle diameter in the ink composition is 0.5 μm or more and 2 μm or less, the total film thickness including the coating layer is 10 nm or more and 50 nm or less, and the average number of the laminated metallic pigment particles in the metallic image is 3 or more and 30 or less.

11 Claims, 1 Drawing Sheet

(56) References Cited

FOREIGN PATENT DOCUMENTS

| JP | 2008-174712 A | 7/2008 | | |
| JP | 2008174712 A | * 7/2008 | ............ | C09D 17/00 |
| JP | 2008-208330 A | 9/2008 | | |
| JP | 2011-132483 A | 7/2011 | | |

* cited by examiner

INK JET RECORDING METHOD AND RECORDED MATTER

Priority is claimed under 35 U.S.C. §119 to Japanese Application No. 2012-245102 filed on Nov. 7, 2012, is hereby incorporated by reference in its entirety.

BACKGROUND

1. Technical Field

The present invention relates to an ink jet recording method and recorded matter.

2. Related Art

Heretofore, an ink jet recording device is known which records images and characters on recording media by minute liquid droplets of an ink composition discharged from nozzles of an ink jet recording head.
On the other hand, a development of an ink jet ink composition containing various components, such as coloring materials, surfactants, water, and organic solvents, as the ink composition has been performed. Furthermore, formation of images having metallic gloss (hereinafter sometimes referred to as a metallic image) on recording media by an ink jet recording method has also been proposed.

JP-A-2002-088274 and JP-A-2004-131542 disclose aqueous metallic coatings for performing metallic gloss coating and describe one in which an aluminum pigment is covered with silica. Moreover, as an ink composition containing a metal pigment suitable for ink jet, JP-A-2008-174712 proposes a dispersion liquid and an ink composition containing aluminum particles having a plate shape.

In ink or coatings, when the material of the metallic pigment is aluminum and moisture is present in a medium, the aluminum reacts with water, for example, during storage or after applying the same to a target, so that desired metallic gloss is not sufficiently obtained. The above-described patent documents have made an attempt of solving the problems by, for example, providing various coatings on the surface of the aluminum.

However, particularly in an ink jet recording method, when aluminum has been used as the metallic pigment for the ink composition in an aqueous system, a good metallic gloss image has not always stably been obtained only by suppressing the reaction of the aluminum and water.

The ink jet recording is a complicated system. Particularly when obtaining a metallic image, the quality of the image to be obtained is determined after mutual correlation of the properties of an aluminum pigment, the character of a recording medium, and various conditions in the ink jet recording, for example. The present inventors have found that, in order to obtain a good metallic image by an ink composition containing a specific aluminum pigment, particularly the arrangement of the aluminum pigment which is made to adhere to a recording medium among various conditions considerably affects the quality of an image to be obtained, and thus have accomplished the invention.

SUMMARY

An advantage of some aspects of the invention is to provide an ink jet recording method capable of obtaining an image having good metallic gloss and recorded matter obtained by the method.

The invention has been made in order to solve at least one part of the above-described problems and can be realized as the following aspects or application examples.

APPLICATION EXAMPLE 1

An ink jet recording method according to a first aspect of the invention includes discharging an ink composition containing a metallic pigment to a recording medium using a recording head, and then recording a metallic image in a recording region of the recording medium, in which particles of the metallic pigment have a plate shape and have a coating layer on the surface, the average particle diameter in the ink composition is 0.5 µm or more and 2 µm or less, the total film thickness including the coating layer is 10 nm or more and 50 nm or less, and the average number of the laminated metallic pigment particles in the metallic image is 3 or more and 30 or less.

According to the ink jet recording method of this application example, the balance of the total film thickness of the metallic pigment particles and the lamination number thereof in the metallic image is good, and therefore an image having good metallic gloss can be obtained.

APPLICATION EXAMPLE 2

In Application example 1, the coverage of the metallic image to the recording region on the recording medium may be 90% or more.

According to the ink jet recording method of this application example, an image having good metallic gloss can be obtained.

APPLICATION EXAMPLE 3

In Application Example 1 or Application Example 2, the recording head may be a serial type head, the recording resolution of the metallic image in the main scanning direction of the recording head may be less than or equal to two times the head resolution of the recording head, and the recording medium may be a low absorbing or non-absorbing recording medium.

According to the ink jet recording method of this application example, an image having good metallic gloss can be obtained at a high throughput.

APPLICATION EXAMPLE 4

In Application Example 1 or Application Example 2, the recording head may be a line type head, and the recording medium may be an absorbing recording medium.

According to the ink jet recording method of this application example, an image having good metallic gloss can be obtained at a high throughput.

APPLICATION EXAMPLE 5

In any one example of Application Example 1 to Application Example 4, the film thickness of the coating layer may be 0.5 nm or more and 15 nm or less.

According to the ink jet recording method of this application example, an image having better metallic gloss can be obtained.

APPLICATION EXAMPLE 6

In any one example of Application Example 1 to Application Example 5, the method may further include discharging a color ink composition containing a color coloring material to the recording medium using a recording head, and then recording a color image, in which the discharge frequency of the recording head when recording the metallic image may be less than the discharge frequency of the recording head when recording the color image.

According to the ink jet recording method of this application example, the discharge stability of the ink composition is high and an image having better metallic gloss can be obtained.

APPLICATION EXAMPLE 7

In any one example of Application Example 1 to Application Example 6, the method may further include discharging a color ink composition containing a color coloring material to the recording medium using a recording head, and then recording a color image, in which the driving potential difference of the recording head when recording the metallic image may be higher than the driving potential difference of the recording head when recording the color image.

According to the ink jet recording method of this application example, the discharge stability of the ink composition is high and an image having better metallic gloss can be obtained.

APPLICATION EXAMPLE 8

In Application Example 6 or Application Example 7, the difference between the flying speed (m/s) of a first liquid droplet of the ink composition when recording the metallic image and the flying speed (m/s) of a first liquid droplet of the color ink composition when recording the color image may be less than 4.

According to the ink jet recording method of this application example, the discharge stability of the ink composition is high and an image having better metallic gloss can be obtained.

APPLICATION EXAMPLE 9

Recorded matter according to a ninth aspect of the invention is recorded by the ink jet recording method according any one example of Application Example 1 to Application Example 8.

In the recorded matter of this application example, a metallic image is formed and the metallic gloss of the metallic image is very good.

BRIEF DESCRIPTION OF THE DRAWINGS

The invention will be described with reference to the accompanying drawings, wherein like numbers reference like elements.

DESCRIPTION OF EXEMPLARY EMBODIMENTS

Some embodiments of the invention are described below. The embodiments described below describe an example of the invention. The invention is not limited to the following embodiments at all and also includes various modifications carried out in the range where the gist of the invention is not altered. All the configurations described below are not necessarily indispensable configurations of the invention.

1. INK JET RECORDING METHOD

An ink jet recording method according to this embodiment includes discharging an ink composition containing a metallic pigment to a recording medium using a recording head, and then recording a metallic image in a recording region of the recording medium.

1.1. Metallic Pigment

In the metallic pigment contained in the ink composition used in this embodiment, the surface of the metal pigment is covered with a film (hereinafter sometimes referred to as a "coating film") containing an inorganic oxide. In this specification, the "pigment" refers to an aggregate of pigment particles constituted by a plurality of the pigment particles.

The shape of the pigment particles constituting the metal pigment is a plate shape. The plate shape is a shape, such as a scale shape, a leaf shape, a tabular shape, and a film shape, for example. Also in the metal pigment (metallic pigment) covered with the coating film, the shape is a plate shape. When the pigment particles have a plate shape, good metallic gloss is easily obtained when adhering to a recording medium.

In the metallic pigment, i.e., the metal pigment covered with the coating film, the 50% average particle diameter R50 (hereinafter sometimes simply referred to as "R50") of the equivalent circle diameter determined from the area of an projected image of the particles obtained by a particle image analyzer is 0.5 μm or more and 2 μm or less and preferably 0.7 μm or more and 1.8 μm or less.

Herein, the "equivalent circle diameter" refers to the diameter of a circle having an area equal to the area of the projected image of the pigment particles obtained using a particle image analyzer. For example, when the projected image of the pigment particles is a polygon, the diameter of a circle having an area equal to the area of the projected image, i.e., the equivalent circle diameter, can be determined by determining the area of the projected area by image processing or the like, and then dividing the area by the ratio of the circumference of a circle to the diameter.

As the particle image analyzer for measuring the area of the projected image of the pigment particles, the equivalent circle diameter, a flow particle image analyzer FPIA-2100, FPIA-3000, or FPIA-3000S (all manufactured by SYSMEX CORPORATION), and the like are mentioned, for example. The average particle diameter of the equivalent circle diameter as used herein is the particle diameter based on the number.

In this embodiment, the maximum value of the equivalent circle diameter of the metallic pigment particles is preferably 3 μm or less. When the equivalent circle diameter of the largest particles is 3 μm or less, clogging of a nozzle opening portion or an ink channel can be suppressed when used for an ink jet recording device.

The thickness of the metallic pigment particles is 5 nm or more and 100 nm or less, preferably 5 nm or more and 70 nm or less, and still more preferably 10 nm or more and 50 nm or less. In the ink jet recording method of this embodiment, the R50 and the thickness of the metallic pigment are within the ranges mentioned above, and therefore the metallic gloss and the discharge stability from a recording head are good. The thickness of the metal pigment particles in the state where the coating film is not provided is 1 nm or more and 90 nm or less, preferably 2 nm or more and 50 nm or less, and still more preferably 3 nm or more and 45 nm or less. Due to the fact that the thickness of the metal pigment particles is within the ranges mentioned above, the metallic gloss of the metallic pigment becomes good.

The thickness of the metallic pigment, the thickness of the metal pigment, and the thickness of the coating film can also be measured by observing the cross section of the pigment particles using an electron microscope, for example. For the electron microscope, a transmission electron microscope (TEM, JEOL JEM-2000EX), a field emission scanning electron microscope (FE-SEM, Hitachi S-4800), a scanning transmission electron microscope (STEM, "HD-2000" manufactured by Hitachi High-Technologies Corporation.), and the like can be used. When measuring the thickness by the electron microscope, the arithmetic average of the thickness obtained when selecting a plurality of pigment particles at random, and then individually measuring the particles may be used, for example.

The thickness of the coating film is 0.5 nm or more and 20 nm or less, preferably 0.5 nm or more and 15 nm or less, and still more preferably 0.5 nm or more and 10 nm or less. When the thickness of the coating film is within the ranges mentioned above, the water resistance of the metallic pigment becomes good and a reduction in the metallic gloss can be suppressed.

The metal pigment in the metallic pigment is not particularly limited insofar as the metallic gloss can be exhibited when made to adhere to a medium. For example, one selected from the group consisting of aluminum, silver, gold, platinum, nickel, chromium, tin, zinc, indium, titanium, and copper or an alloy containing two or more kinds thereof is mentioned. Among the above, aluminum or an aluminum alloy is preferable from the viewpoint of the metallic gloss and the cost.

The material of the film (coating film) containing an inorganic oxide is preferably one containing alkoxysilane (for example, tetraethoxysilane (TEOS)), polysilazane, or a compound derived from these compounds, for example. Among the above, alkoxysilane or a derivative thereof is more preferable in terms of the fact that a uniform and flat film is easily formed on the surface of the metal pigment. Particularly when using an aluminum pigment containing aluminum or an aluminum alloy as the metal pigment, it is still more preferable to contain tetraethoxysilane or a derivative thereof in terms the fact that a silica film excellent in adhesiveness with the aluminum pigment can be formed.

The metallic pigment may be supplied in the state of a dispersion liquid. As the components contained in the metallic pigment dispersion liquid, water, organic solvents, basic catalysts, surfactants, tertiary amines, buffer solutions, and the like are mentioned and can be compounded as appropriate.

For water, it is preferable to use pure water or ultrapure water, such as ion exchange water, ultrafiltration water, reverse osmosis water, and distilled water. In particular, water obtained by sterilizing the water mentioned above by ultraviolet exposure or addition of hydrogen peroxide can suppress the generation of mold or bacteria over a long period of time and therefore is preferable.

Mentioned as an example of the organic solvents are, for example, alcohols (methyl alcohol, ethyl alcohol, propyl alcohol, butyl alcohol, isopropyl alcohol, alcohol fluoride, and the like), ketones (acetone, methyl ethyl ketone, cyclohexanone, and the like), carboxylate esters (methyl acetate, ethyl acetate, propyl acetate, butyl acetate, methyl propionate, ethyl propionate, and the like), ethers (diethyl ether, dipropyl ether, tetrahydrofuran, dioxane, and the like), polyhydric alcohols (ethylene glycol, diethylene glycol, triethylene glycol, polyethylene glycols, polypropylene glycol, propylene glycol, butylene glycol, 1,2,6-hexanetriol, thioglycol, hexylene glycol, glycerin, trimethylol ethane, trimethylol propane, and the like), glycol ether solvents (alkylene glycol monoether, such as triethylene glycol monobutyl ether, alkylene glycol diether, such as diethylene glycol diethylether, and the like), and the like.

The basic catalyst may be added as a catalyst for the reaction of TEOS, for example, in order to form the film containing an inorganic oxide on the surface of the metal pigment (for example, aluminum pigment) and includes, for example, ammonia, trialkyl amine, ethanol amine, sodium hydroxide, potassium hydroxide, urea, choline, tetraalkyl ammonium hydroxide, and the like.

As the surfactant, all known surfactants, such as anionic surfactants, cationic surfactants, nonionic surfactants, amphoteric surfactants, and polymer surfactants, can be used.

The tertiary amine can sometimes increase the dispersibility of the metallic pigment due to the effect of steric hindrance or the pH adjustment action. As the tertiary amine, hydroxylamines, such as triethanol amine, tripropanol amine, tributanol amine, N,N-dimethyl-2-amino ethanol, N,N-diethyl-2-aminoethanol, are mentioned, for example.

As the buffer solution, all known buffer solutions can be used. For example, good buffers, such as 4-(2-hydroxyethyl)-1-piperazine ethane sulfonate (HEPES), morpholino ethane sulfonate (MES), carbamoylmethylimino bisacetic acid (ADA), piperazine-1,4-bis(2-ethane sulfonate) (PIPES), N-(2-acetamide)-2-amino ethane sulfonate (ACES), colamine chloride, N,N-bis(2-hydroxyethyl)-2-amino ethane sulfonate (BES), N-tris(hydroxymethyl)methyl-2-amino ethane sulfonate (TES), acetamide glycine, tricine, glycine amide, and bicin, phosphate buffer solutions, tris buffer solutions, and the like are mentioned.

1.2. Preparation of Metallic Pigment

The metallic pigment according to this embodiment can be obtained as a dispersion liquid by the following manufacturing method, for example. Hereinafter, as an example of the preparation of the dispersion liquid of the metallic pigment according to this embodiment, a manufacturing method using an aluminum pigment as the metal pigment and using tetraethoxysilane (TEOS) as the raw material forming the film containing an inorganic oxide (Stober method) is described. The manufacturing method of the metallic pigment is not limited to the following example.

The metallic pigment dispersion liquid can be prepared by a technique including preparing the aluminum pigment dispersion liquid in which an aluminum pigment is dispersed in an organic solvent, and then adding TEOS into the aluminum pigment dispersion liquid to allow TEOS to react with the same.

First, a pigment raw material having a structure such that a separation layer and an aluminum layer are successively laminated on a sheet base material surface is prepared. The sheet base material is not particularly limited and is a polyethylene terephthalate (PET) film, for example. The separation layer is not particularly limited insofar as the layer has separation properties and is formed with an acrylic acid polymer or a modified nylon resin, for example. The pigment raw material is obtained by laminating the separation layer and the aluminum layer on the sheet base material.

The separation layer can be formed by applying a resin solution to a sheet-like base material, and drying the same. The aluminum layer can be formed by forming aluminum into a film by, for example, vacuum deposition, ion plating, sputtering, PVD (Physical Vapor Deposition), or the like on the separation layer. Herein, an aspect in which the pigment raw material has only the aluminum layer is described but the pigment raw material may have a silicon oxide layer, a resin layer, a coloring material layer, and the like.

Next, the aluminum layer is separated from the sheet base material of the pigment raw material in an organic solvent utilizing the separation layer, and then pulverized by ultrasonic treatment or the like, thereby obtaining a dispersion liquid of an aluminum pigment in which the aluminum pigment is dispersed in the organic solvent. The organic solvent to be used is the same as those described above. The shape of the aluminum pigment particles in the obtained dispersion liquid of the aluminum pigment is a plate shape. The aluminum pigment contained in the obtained dispersion liquid of the aluminum pigment may be washed as required. For the washing of the aluminum pigment, the organic solvent mentioned above can be used.

Subsequently, 0.5 part by mass or more and 2.5 parts by mass or lower of TEOS based on 1 part by mass of the aluminum pigment, for example, is added into the obtained dispersion liquid of the aluminum pigment, and then allowed to react with each other within a period of 10 days or more and 60 days or less, for example. Thus, a hydroxyl group present on the surface of the aluminum pigment and a silanol group of the TEOS undergo hydrolysis condensation or the like, so that a silica film is formed on the surface of the aluminum pigment, and thus a dispersion liquid of the metallic pigment of this embodiment can be obtained.

Herein, the film quality and the like of the coating film can be controlled by changing the combination of various additives, the reaction time, and the like when forming the coating film (silica film) as appropriate. After the addition of the TEOS, a basic catalyst may be further added to accelerate the hydrolysis condensation. The basic catalyst is as described above. After the preparation, at least one part of the organic solvent may be removed as required, and an aqueous medium, a surfactant, a tertiary amine, a buffer solution, and the like may be further added as required. Furthermore, aging treatment may be performed after the preparation. The aging refers to heating the obtained dispersion liquid of the metallic pigment for a period of 1 day or more and 14 days or less at a temperature of 30° C. or higher and 80° C. or less.

The dispersion liquid of the metallic pigment according to an example of this embodiment in which the surface of the aluminum pigment (metal pigment) is covered with the silica film (coating film) can be prepared as described in the example above. Powder of the metallic pigment particles can also be obtained by removing a dispersion medium and a solute as required.

1.3. Ink Composition

The ink composition according to this embodiment contains the metallic pigment described above. The ink composition according to this embodiment may be prepared using the dispersion liquid of the metallic pigment described above. In the ink composition according to this embodiment, the ink composition may be an aqueous ink composition. The aqueous ink composition refers to an ink composition containing 20% by mass or more and preferably 40% by mass or more of water as the solvent. For water, it is preferable to use pure water or ultrapure water, such as ion exchange water, ultrafiltration water, reverse osmosis water, and distilled water.

The concentration of the metallic pigment in the ink composition is preferably 0.1 to 5.0% by mass, more preferably 0.1 to 3.0% by mass, still more preferably 0.25 to 2.5% by mass, and particularly preferably 0.5 to 2.0% by mass in terms of the solid content concentration based on the total mass of the ink composition.

The ink composition according to this embodiment may contain water, the organic solvent, the basic catalyst, the surfactant, the tertiary amine, the buffer solution, and the like derived from the dispersion liquid of the metallic pigment. The ink composition of this embodiment may further contain a surfactant, alkanediol, a pyrolidone derivative, a pH adjuster, and the like.

As the surfactant, acetylene glycol surfactants or polysiloxane surfactants can be mentioned. The acetylene glycol surfactants and the polysiloxane surfactants can improve the wettability to a surface to be recorded of a recording medium and the like, and can improve the permeability of an ink. Mentioned as the acetylene glycol surfactants are, for example, 2,4,7,9-tetramethyl-5-desine-4,7-diol, 3,6-dimethyl-4-octyne-3,6-diol, 3,5-dimethyl-1-hexyne-3-ol, 2,4-dimethyl-5-hexyne-3-ol, and the like. Moreover, commercially-available items can also be utilized for the acetylene glycol surfactants and include, for example, Olfine E1010, STG, and Y (all manufactured by Nisshin Chemical Co., Ltd.), Surfynols 104, 82, 465, 485, and TG (all manufactured by Air Products and Chemicals Inc.). As the polysiloxane surfactants, commercially-available items can be used and include, for example, BYK-347, and BYK-348 (all manufactured by BYK Chemie Japan, Inc.), and the like. Furthermore, in the ink composition, other surfactants, such as anionic surfactants, nonionic surfactants, and amphoteric surfactants, can also be compounded.

As the alkanediols, 1,2-alkanediols having carbon atoms of 4 or more and 8 or less, such as 1,2-butanediol, 1,2-pentanediol, 1,2-hexanediol, 1,2-heptanediol, and 1,2-octanediol, can be mentioned. Among the above, 1,2-hexane diol, 1,2-heptane diol, and 1,2-octane diol having carbon atoms of 6 or more and 8 or less have good permeability to a recording medium, and therefore are preferable.

Mentioned as the pyrolidone derivative are N-methyl-2-pyrolidone, N-ethyl-2-pyrolidone, N-vinyl-2-pyrolidone, 2-pyrolidone, 5-methyl-2-pyrolidone, and the like, for example.

Mentioned as the pH adjuster are, for example, potassium dihydrogen phosphate, disodium hydrogen phosphate, sodium hydroxide, lithium hydroxide, potassium hydroxide, ammonia, diethanol amine, triethanol amine, triisopropanol amine, potassium carbonate, sodium carbonate, sodium hydrogencarbonate, and the like.

Furthermore, in the ink composition of this embodiment, additives, such as a fixing agent, such as water-soluble rosin, an antifungal agent and an antiseptic, such as sodium benzoate, an antioxidant and a ultraviolet absorber, such as allophanates, a chelating agent, and an oxygen absorbent, can be compounded. These additives can also be used singly or in combination of two or more kinds thereof.

The viscosity at 20° C. of the ink composition is preferably 2 mPa·s or more and 10 mPa·s or less and more preferably 3 mPa·s or more and 5 mPa·s or less. When the viscosity at 20° C. of the ink composition is within the ranges mentioned above, curved flight or the like of liquid droplets of the ink composition and the like when discharged from nozzles of a recording head can be reduced.

The pH of the ink composition is preferably 5.0 or more and 8.5 or less, more preferably 6.0 or more and 8.5 or less, and particularly preferably 7.0 or more and 8.5 or less. When the pH of the ink composition is within the ranges mentioned above, the reaction of the metallic pigment and the medium can be suppressed and elution of the metal from the coating film or the metallic pigment can be suppressed.

The ink composition according to this embodiment is obtained by mixing the components described above in an arbitrary order, and then performing filtration and the like as required to remove impurities. As a method for mixing the components, a method including successively adding materials into a container having a stirring device, such as a mechanical stirrer or a magnetic stirrer stirring, and then stirring and mixing the materials is suitably used. As the filtration method, centrifugal filtration, filter filtration, and the like can be performed as required.

1.4. Formation of Metallic Image

The ink jet recording method of this embodiment is carried out by discharging the ink composition described above to a recording medium using a recording head. Then, a metallic image is formed in a recording region of the recording medium. The recording region on the recording medium is not particularly limited and is a region where a metallic gloss image is to be formed by the ink composition and the ink composition adheres into the region.

The ink jet recording method according to this embodiment is a method employing an ink jet recording device having a recording head and includes discharging the ink composition described above from the recording head to form a metallic image on a recording medium. First, the ink jet recording device for use in the ink jet recording method according to this embodiment is described.

For the ink jet recording device of this embodiment, both a serial type and a line type can be used. On the ink jet recording devices of these types, a recording head is mounted, by which a predetermined image can be formed by discharging liquid droplets of the ink composition from nozzle openings of the recording head at a predetermined timing and with a predetermined volume (mass) while changing the relative position relationship of the recording medium and the recording head to make the ink composition adhere to the recording medium.

Herein, in general, in the serial type ink jet recording device, the transport direction of the recording medium and the direction of the reciprocating motion of the recording head intersect. The relative position relationship of the recording medium and the recording head is changed depending on the combination of the reciprocating motion of the recording head and the transport operation (also including the reciprocating motion) of the recording medium. In general, in this case, a plurality of nozzle openings (openings for discharging the ink composition) are arranged in the recording head, and a row of the nozzle openings (nozzle row) is formed along the transport direction of the recording medium. A plurality of nozzle rows are sometimes formed in the recording head according to the number of kinds of the ink composition.

In general, in the line type ink jet recording device, the recording head does not perform reciprocating motion and the relative position relationship of the recording medium and the recording head is changed by changing the relative position relationship of the recording medium and the recording head by transporting the recording medium. Also in this case, in general, a plurality of nozzle openings are arranged and a row of the nozzle openings (nozzle row) is formed along the direction intersecting the transport direction of the recording medium in the recording head.

In this specification, in the serial type ink jet recording device, the direction of the reciprocating motion of the recording head is sometimes referred to as a "main scanning direction" and the transport direction of the recording medium is sometimes referred to as a "subscanning direction". On the other hand, in the line type ink jet recording device, the transport direction of the recording medium is sometimes referred to as a "scanning direction".

Next, the relationship of the resolution of an image to be formed on the recording medium and the number per length of the nozzle row of the nozzle openings to be arranged in the recording head (hereinafter sometimes referred to as a "head resolution") is described. In the case where the head resolution is 180 per inch (i.e., 180 dpi (dot/inch)), for example, when the ink composition is discharged from each nozzle opening to the recording medium, a row of dots with 180 dpi corresponding to the arrangement of the nozzles in the nozzle row is formed on the recording medium. Even when liquid droplets of the ink composition are discharged from each nozzle opening while moving the recording head and the recording medium relatively to the direction orthogonal to the direction where the nozzle row extends, the dots in the direction along the direction of the nozzle row are formed with a resolution of 180 dpi on the recording medium. More specifically, the resolution (image resolution) in the direction along the direction where the nozzle row extends of the image is 180 dpi in this case.

The interval of the liquid droplets in the direction perpendicular to the direction of the nozzle row of the recording head on the recording medium is dependent on the time interval (discharge frequency) at which the liquid droplets are discharged from the nozzle openings. The relationship of the image resolution and the head resolution in the case of moving the recording head and the recording medium relatively to the direction orthogonal to the nozzle row is common in the serial type ink jet recording device and the line type ink jet recording device.

Moreover, in the serial type ink jet recording device, the recording medium can be moved in the direction intersecting the direction of the reciprocating motion of the recording head. Therefore, even when the resolution of the recording head is, for example, 180 dpi, the interval of the dots in the direction along the nozzle row in the image to be formed on the recording medium can be made small by moving the recording medium. More specifically, when, after performing recording by moving the recording head in the direction orthogonal to the nozzle row to the recording medium, recording is performed by moving the recording medium in the direction along the nozzle row of the recording head by only a distance of ½ of the dot interval, for example, and then moving the recording head in the direction orthogonal to the nozzle row to the recording medium again, the resolution in the direction along the nozzle row of the image to be formed on the recording medium can be doubled, i.e., equivalent to 360 dpi. Furthermore, since the movement distance in the direction along the nozzle row of the recording head to the recording medium can be set to ⅓, ¼, ⅛, and the like of the dot interval, it is easy to form an image having a resolution higher than the head resolution. However, in the case of increasing the image resolution by such a technique, the fact that the image resolution and the time required for the image recording establishes a trade-off relationship is to be taken into consideration.

The ink jet recording system employs the serial type ink jet recording device or the line type ink jet recording device described above. The system is not particularly limited insofar as the ink composition can be discharged in the form of liquid droplets from minute nozzle openings, and the liquid droplets can be made to adhere to the recording medium. For example, as the ink jet recording system, an electrostatic suction system, a system in which ink droplets are ejected by pump pressure, a system employing a piezoelectric element, a system in which ink liquid is heated and foamed by a micro-electrode to eject ink droplets, and the like can be mentioned.

For the ink jet recording device used in this embodiment, known configurations, such as a drying unit, a roll unit, and a winding-up device, for example, can be employed without limitation.

The ink jet recording method of this embodiment includes an image formation process of discharging liquid droplets of the ink composition described above onto a recording medium by the ink jet recording device described above. Moreover, the ink jet recording method according to this embodiment may further include a heating process of heating a recording medium as required when or after forming an image.

The image formation process is a process of discharging liquid droplets of the ink composition described above onto a recording medium by an ink jet recording system and making the liquid droplets adhere thereto to thereby form a predetermined image.

The ink jet recording method according to this embodiment may include a heating process. The heating process is a process of heating the recording medium and/or the ink composition (image) on the recording medium at least either in the image formation process or after the image formation process. By providing the heating process, a liquid medium (specifically, water, alkyl polyol, glycol ether, and the like) contained in the ink composition which is made to adhere onto the recording medium can be promptly evaporated. Thus, an image with high image quality can be obtained in a short time also on an ink non-absorbing recording medium, such as a plastic film having no ink absorption layer.

The heating process is not particularly limited insofar as the process is a method of promoting the evaporation of the liquid medium present in ink. Mentioned as methods for use in the heating process are a method of applying heat to a recording medium at least either in the heating process or after the heating process, a method of applying wind to an image on a recording medium at least either in the image formation process or after the image formation process, a method of combining the methods, and the like. Specifically, measures for use in these methods, forced air heating, radiation heating, conductive heating, high frequency drying, microwave drying, and the like are preferably used.

In this specification, the coverage of the metallic image to the recording region on a recording medium is defined as a ratio (percentage) of the area of the ink composition which is made to adhere into the region based on the area of the region in which an image having metallic gloss is to be recorded with the ink composition on the recording medium.

The size of the recording region can be arbitrarily set. Even in the case where only one liquid droplet of the ink composition adheres to a recording medium, the ratio is 100% when the recording region is a region smaller than the area of the ink composition which is made to adhere to the recording medium. In the case where the recording region is a square, 1 mm on a side, when only one liquid droplet of the ink composition adheres into the region and wets and spreads in the shape of a circle with a radius of 100 μm, the calculated coverage is about 3.14%. In the case where the recording region is a square, 1 mm on a side, when 30 liquid droplets of the ink composition are made to adhere into the recording region, each liquid droplet forms a circle with a radius of 100 μm in the recording region, and the liquid droplets wet and spread without overlapping, the calculated coverage is about 94.2%. In the case where the recording region is a square, 1 mm on a side, when a large number of liquid droplets of the ink composition are made to adhere into the recording region, each liquid droplet forms a circle with a radius of 100 μm, and then the liquid droplets are overlapped with each other to be made to adhere into the recording region without a space, the coverage is 100%. In this embodiment, the recording region has an area larger than the area where one liquid droplet of the ink composition adhering to the recording medium wets and spreads. The coverage defined herein is a concept different from the duty described later.

In the ink jet recording method of this embodiment, the coverage of the metallic image to the recording region of the recording medium is preferably 80% or more, more preferably 90% or more, and still more preferably 95% or more in order to improve the metallic gloss of the image. The upper limit of the coverage is 100% from the definition. When a larger number of liquid droplets of the ink composition are made to adhere to the recording region in order to achieve a coverage of 100%, the thickness of the metallic image increases.

A case where a "solid image" of a metallic image is formed on a recording medium is described. The solid image refers to an image in which the ink composition is arranged without a space on a recording medium. More specifically, the coverage in the solid image is 100%. As described above, there is a concept of the head resolution in the ink jet recording. Therefore, in order to form the solid image, the ink composition is required to be made to adhere by, for example, wetting and spreading on a recording medium to such an extent that the ink composition can fill the space between the nozzle openings.

Both in the serial type and the line type, increasing the volume (mass) of liquid droplets of the ink composition, increasing the wetting and spreading properties of the ink composition on a recording medium, suppressing repelling of the ink composition on a recording medium, increasing the head resolution, increasing the duty, and the like are possible techniques of forming the solid image (image with a coverage of 100%).

The "duty" herein is a value calculated by the following equation.

$$\text{Duty}(\%) = \text{Number of actually printed dots}/\text{Number of pixels} \times 100$$

Therefore, for example, 100% duty means that one ink droplet adheres to all the pixels. For example, 150% duty means that 1.5 ink droplets per pixel adhere. A case where even when the duty is 100%, the coverage does not sometimes reach 100% depending on the volume and the wetting and spreading properties of ink droplets is to be taken into consideration.

In the case of the serial type case, the ink composition can be made to adhere to a recording medium with a resolution higher than the head resolution as described above, this technique can be selected as a technique for forming a good solid image. However, in the technique in the serial type, the time required for the operation of a recording head or a recording medium increases. Therefore, when an increase in the recording speed is regarded as important, the number of times (the number of passes) of the reciprocating motion of the recording head does not excessively increase.

In the ink jet recording method of this embodiment, the ink jet recording device may be a serial type. In that case, by setting the recording resolution of the metallic image in the main scanning direction of the recording head to be less than or equal to two times the head resolution of the recording head, the metallic image with a sufficient coverage can be recorded while saving the time required for the recording. Thus, the time required for drying the ink composition which is made to adhere can also be secured and bleeding and blurring can be suppressed. Therefore, a good metallic image can be effectively recorded on particularly a non-absorbing or low-absorbing recording medium. Furthermore, the ink jet recording device may be a line type. In that case, when the recording medium is an absorbing recording medium, the ink composition which is made to adhere quickly penetrates. Therefore, the volume of liquid droplets of the ink composition can be increased, so that a better metallic image can be recorded.

1.5. Recording Medium

The recording medium is not particularly limited and includes, for example, absorbing recording media, such as paper, film, and cloth, low absorbing recording media, such as printing paper, non-absorbing recording media, such as metal, glass, and polymer, and the like. The recording medium may be colorless and transparent, translucent, colored and transparent, chromatic and opaque, and achromatic and opaque, and the like. One having a smooth recording surface as the recording medium can increase the metallic gloss of the metallic image, and therefore is preferable. As such a recording medium, photograph paper, gloss paper, coated paper, polymer film, and the like are mentioned.

The ink jet recording method according to this embodiment employs the ink composition described above, and thus can be suitably applied to non-absorbing or low-absorbing recording media. The non-absorbing or low-absorbing recording media refer to recording media having a property such that the recording media do not or hardly absorb the ink composition on a recording surface.

Quantitatively, the non-absorbing or low-absorbing recording media refer to "recording media in which the water absorption amount from the start of the contact to 30 msec$^{1/2}$ is 10 mL/m$^2$ or less in the Bristow method". The Bristow method is a method which is the most popular as a method for measuring the liquid absorption amount in a short time, and is employed also in Technical Association of the Pulp and Paper Industry (JAPAN TAPPI). The details of the test method are described in Standard No. 51 of "JAPAN TAPPI Paper Pulp Test Method, 2000" "Paper and Board-Liquid absorbability test method-Bristow method". More specifically, the absorbing recording media refer to those which are not included in the non-absorbing or low-absorbing recording media.

Mentioned as the non-absorbing recording media are, for example, those in which a base material, such as a plastic film and paper having an ink absorbing layer, is coated with plastic and a plastic film is bonded to the base material, and the like. As the plastic mentioned herein, polyvinyl chloride, polyethylene terephthalate, polycarbonate, polystyrene, polyurethane, polyethylene, polypropylene, and the like are mentioned.

As the low-absorbing recording media, a coated paper in which a coating layer for receiving an oil-based ink is provided on the surface is mentioned and, for example, printing paper, such as art paper, coated paper, and mat paper, is mentioned. Furthermore, ink non-absorbing or low absorbing recording media, such as metal and glass, may be acceptable besides the recording media mentioned above.

1.6. Number of Laminated Pigment Particles in Metallic Image

According to the ink jet recording method of this embodiment, recording is performed in such a manner that the average number of the laminated metallic pigment particles is 3 or more and 30 or less in the metallic image recorded on the recording medium. The average number of the laminated metallic pigment particles in the metallic image can be counted by the following method.

First, a part of the metallic image on the recording medium is cut by a microtome or a FIB (Focused Ion Beam), and then the cross section of the metallic image is exposed in such a manner as to have a width of at least 20 μm. In this process, cutting treatment (trimming), embedding treatment, tungsten deposition treatment, and the like may be performed as required. When exposing the cross section of the metallic image, artificiality is eliminated as much as possible and the cross section of an average portion is exposed.

Next, the metallic image including the exposed cross section is used as a sample, and then the cross section is observed under SEM (scanning electron microscope). In the SEM image, a plurality of counting portions are determined with an interval of at least 5 μm on the cross section of the metallic image, and then the number of the laminated metallic pigment particles in each portion is counted. In this process, by increasing the width of the cross section or exposing a plurality of other cross sections, the number of counting portions is set to be 20 or more. In the counting of the lamination number, the magnification and the resolution of the SEM are increased, so that artificial error is excluded as much as possible.

Then, the sum of the lamination number in each counting portion is divided by the number of counting portions, and the value is defined as the average number of the laminated metallic pigment particles. Since the counting portion is a portion where the metallic pigment particles are present, the lower limit of the lamination number in each counting portion is 1. In the production of the cross section, when the cross section is produced into a shape which allows the penetration of an electron beam, such as a thin section, the cross section can be observed under a TEM (transmission electron microscope), and then the lamination number may be counted by the TEM. In the case of the observation by the TEM, the thickness of the metallic pigment particles, the thickness of the metal pigment, and the thickness of the coating layer can also be more precisely measured.

1.7. Modification of Ink Jet Recording Method

The ink jet recording method of this embodiment may further include discharging a color ink composition containing a color coloring material to a recording medium using a recording head, and then recording a color image.

The color ink composition usable in the ink jet recording method of this embodiment is not particularly limited and a general one as a color ink composition for ink jet recording can be used. The color ink composition includes, for example, one containing a coloring material and a surfactant, one containing a coloring material and an ultraviolet ray polymerizable compound, and the like. The color ink composition includes compositions having an achromatic hue or a hue with low saturation, such as so-called black ink composition and white ink composition.

In the ink jet recording method of this embodiment, the recording head which discharges the color ink composition may be the same as or different from the recording head which discharges the ink composition (metallic) described above. A color image recorded with the color ink composition is recorded on a recording medium on which the metallic image is formed. The metallic image and the color image may be recorded with overlapping or without overlapping.

1.8. Driving of Recording Head

The recording head can discharge the ink composition and/or the color ink composition from nozzles. Then, the recording head controls changes in the relative position relationship with the recording medium and the discharge timing to thereby record a predetermined image. The recording head can change the discharge amount, the speed of liquid droplets to be discharged, and the like besides the discharge timing according to a driving signal to be input.

Figure 1:
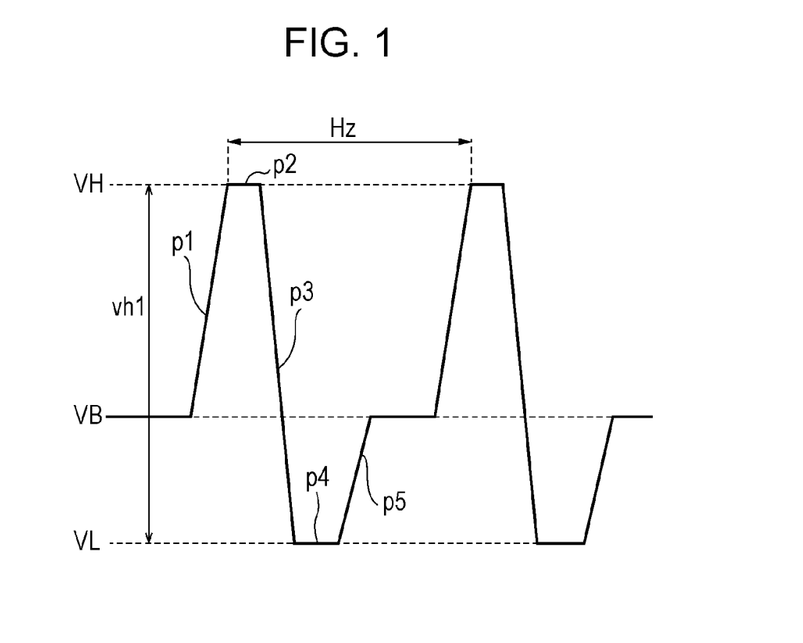
FIG. 1 is a schematic diagram of an example of one driving pulse contained in a driving signal of a recording head.

Next, a printer employing a piezoelectric element is described as an example for a driving signal for use in driving the recording head described above. FIG. 1 illustrates one driving pulse contained in the driving signal. In FIG. 1, the vertical axis represents the potential of the driving pulse and the horizontal axis represents time. The potential difference (driving voltage) from the lowest potential VL to the highest potential VH of the driving pulse is set to vh1. The driving pulse includes an expansion element p1 which expands a pressure chamber due to a potential change to the plus side from the standard potential VB to the expansion potential VH, an expansion holding element p2 which holds the expansion potential VH for a fixed period of time, a contraction element p3 which sharply contracts the pressure chamber due to a potential change to the minus side from the expansion potential VH to the contraction potential VL, a contraction holding (damping hold) element p4 which holds the contraction potential VL for a fixed period of time, and a return element p5 in which the potential returns from the contraction potential VL to the standard potential VB.

When the driving pulse is supplied to an element which performs discharge (Hereinafter, although a heating element, a piezoelectric element, and the like are widely known, a piezoelectric element is described as an example in this specification.), the element acts as follows. First, when the expansion element p1 is supplied to the piezoelectric element, the piezoelectric element contracts and, in connection therewith, the capacity of the pressure chamber changes from the standard capacity corresponding to the standard potential VB to the maximum capacity corresponding to the highest potential VH (herein, expands). Thus, a meniscus of the ink composition exposed to the nozzles is drawn into the side of the pressure chamber. The expansion state of the pressure chamber is held in a fixed state over the period of the supply of the expansion holding element p2.

Subsequent to the expansion holding element p2, when the contraction element p3 serving as an element which changes the voltage in a direction opposite to the direction in which the voltage changes by the expansion element p1 is supplied to the piezoelectric element, the piezoelectric element elongates. Thus, the capacity of the pressure chamber sharply changes from the maximum capacity to the minimum capacity corresponding to the lowest potential VL (herein, contracts). The ink composition in the pressure chamber is pressurized by the sharp contraction of the pressure chamber. Thus, the ink composition of several p1 to several tens of p1 is ejected from nozzles. The contraction state of the pressure chamber is held in a short period of time during the period of the supply of the contraction holding element p4. Thereafter, the damping element p5 is supplied to the piezoelectric element, and thus the capacity of the pressure chamber returns from the capacity corresponding to the lowest potential VL to the standard capacity corresponding to the standard potential VB. The ejection amount (liquid droplet amount) from nozzles can be increased also by further increasing the inclination of the expansion element p1 and the contraction element p3 (Absolute value of the voltage change amount per unit time).

By selectively outputting such a driving pulse among driving signals to the piezoelectric element of the recording head, liquid is ejected from a corresponding nozzle to an adhesion target (medium) according to the outputting. Then, by controlling the driving signal, the liquid ejection operation of the recording head can be controlled.

Figure 2:
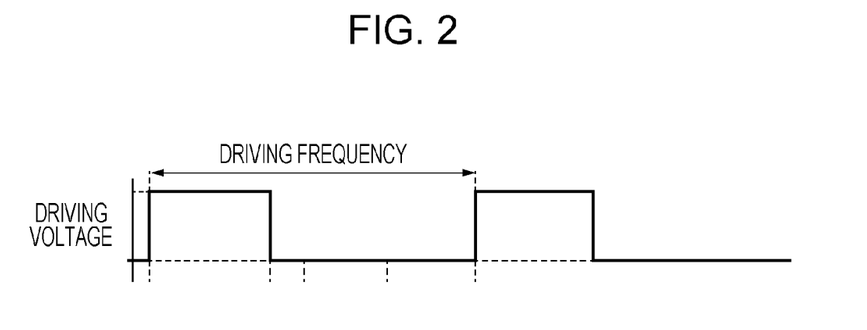
FIG. 2 is a schematic diagram of an example of a waveform of one driving pulse contained in a driving signal of a recording head.

The driving signals are sometimes different in the details depending on the system of the recording head. Common control elements are a discharge frequency when discharging liquid droplets (which is equivalent to the interval of driving the head, and is, for example, the reciprocal of the time from discharging of a liquid droplet to discharging of the next liquid droplet, In FIG. 1, Hz represents the discharge frequency.), a driving voltage for discharging (amplitude (potential difference) in the waveform when discharging), and the like. With respect to the portion of the potential difference in the waveform, when there is no expansion element p1 for holding the expansion state of the pressure chamber, a difference from the standard potential VB to the contraction potential VL is equivalent to the potential difference (driving voltage). By controlling the driving voltage and the voltage waveform, the flying speed of the liquid droplets to be discharged can also be controlled. This applies also to a piezoelectric jet and a thermal jet. The driving system of the recording head in this embodiment is not limited. Although there are various possible modifications of the waveform, the waveform illustrated in FIG. 2 may also be used in the piezoelectric jet and the thermal jet.

According to the ink jet recording method of this embodiment, the driving signal can be set as appropriate. However, it is more preferable to set the discharge frequency of the recording head when discharging the ink composition to be less than the discharge frequency of the recording head when discharging the color ink composition. Thus, both the discharge stability of the ink composition containing the metallic pigment and the discharge stability of the color ink composition can be achieved. It is more preferable to set the driving potential difference of the recording head when discharging the ink composition to be higher than the driving potential difference of the recording head when discharging the color ink composition. The metallic pigment of the invention is a pigment which is more difficult to discharge than the coloring material contained in the color ink composition. With respect to the waveform to be used, when discharged at a high driving voltage (potential difference), the liquid droplet amount between each ink composition can be brought close to each other. For the ink composition containing the metallic pigment, when a waveform having high inclination is used as compared with the color ink composition, the liquid droplet amount between each ink composition can be brought close to each other and thus it is preferable. The difference between the flying speed (m/s) of the first liquid droplet of the ink composition when recording a metallic image and the flying speed (m/s) of the first liquid droplet of the color ink composition when recording a color image is more preferably less than 4 (m/s) and still more preferably less than 2 (m/s).

Thus, both the discharge stability of the ink composition and the discharge stability of the color ink composition become good, and particularly the dot omission in the metallic image to be formed with the ink composition can be sufficiently suppressed. Thus, a metallic image having better metallic gloss can be obtained. The present inventors consider that, as one factor for obtaining the above-described effects by designing the driving signals as described above, the fact that since the ink composition contains the plate-like metallic pigment, the pigment is oriented near nozzles contributes thereto, and the present inventors consider that this fact affects the discharge stability and the like.

As described above, according to the ink jet recording method of this embodiment, the balance of the total film thickness of the metallic pigment and the lamination number in the metallic image is good, and therefore an image having good metallic gloss can be obtained. Moreover, with respect to recorded matter recorded by the ink jet recording method of this embodiment, the metallic image described above is formed on a recording medium and the metallic gloss of the metallic image is very good.

2. EXAMPLES AND COMPARATIVE EXAMPLES

The invention is further described with reference to Examples below but the invention is not limited at all to the following examples.

2.1. Preparation of Ink Composition

2.1.1. Ink Composition

The following ink composition A, ink composition B, and ink composition C were prepared.

The composition of the ink compositions A to C was as follows:
  1,2-hexane diol: 5% by mass
  Urethane resin: 0.5% by mass
  Propylene glycol: 40% by mass
  2-pyrolidone: 5% by mass
  Olfine E1010 (Acetylene glycol surfactant: manufactured by Nisshin Chemical Industry Co., Ltd.): 1% by mass
  Triethanol amine: 0.4% by mass
  Metallic pigment dispersion liquid: Solid content shown in Table 1 (% by mass of the metallic pigment).
Ion exchange water (balance) was added in such a manner as to have the composition, the mixture was mixed and stirred with a magnetic stirrer in a container for 2 hours, and then the mixture was filtered with a membrane filter with a pore size of 5 μm, thereby obtaining the ink compositions.

The metallic pigment dispersion liquid used in each ink composition was prepared as follows.

A resin layer coating liquid containing 3.0% by mass of cellulose acetate butyrate (Butylated ratio of 35 to 39%, manufactured by Kanto Kagaku, Inc.) and 97% by mass of propylene glycol (manufactured by SANKYO CHEMICAL CO., LTD.) was uniformly applied onto a PET film having a film thickness of 100 μm by a bar coating method, and then dried at 60° C. for 10 minutes, thereby forming a resin layer thin film on the PET film. Subsequently, an aluminum vapor deposition layer was formed on the resin layer using a vacuum deposition device ("VE-1010 type vacuum deposition device" manufactured by Vacuum device Co.). Subsequently, the laminate formed by the method was simultaneously subjected to separation, pulverization, and dispersion treatment in propylene glycol using a VS-150 ultrasonic dispersion machine (manufactured by As One Corp.), thereby producing an aluminum pigment dispersion liquid. The obtained aluminum pigment dispersion liquid was filtered using a SUS mesh filter having an opening of 5 μm to thereby remove coarse particles. Subsequently, the filtrate was put into a round-bottomed flask, and then the propylene glycol was distilled off using a rotary evaporator. Thus, the aluminum pigment dispersion liquid was condensed. Thereafter, the concentration of the aluminum pigment dispersion liquid was adjusted, thereby obtaining 5.0% by mass aluminum pigment dispersion liquid.

Subsequently, 20 parts by mass of the obtained aluminum pigment dispersion liquid (1 part by mass of the aluminum pigment) was charged into a beaker, 2 parts by mass of tetraethoxysilane (TEOS) and 0.4 part by mass of 1 mol/L ammonia water which is a basic catalyst were added thereto, and then the mixture was stirred at room temperature for 14 days for hydrolysis condensation (Stober method). Thus, a metallic pigment dispersion liquid containing the aluminum pigment (metallic pigment) on the surface of which a silica film was formed was obtained.

Subsequently, the dispersion liquid was centrifuged (10,000 rpm, 60 minutes), and a part of propylene glycol contained in the metallic pigment dispersion liquid which was the supernatant was removed.

Subsequently, ion exchange water and a surfactant (Product name "DISPERBYK-192", manufactured by BYK-Chemie Japan, Inc.) were added, and then stirred at room temperature for one day, thereby obtaining metallic pigment dispersion liquid. The ion exchange water and the surfactant were added in such a manner that the composition of the metallic pigment dispersion liquid was as follows: 5% by mass of the metallic pigment, 50% by mass of the propylene glycol, 44% by mass of water, and 1% by mass of the surfactant.

With respect to the metallic pigment used in the ink composition A, the average particle diameter D50 was 0.95 μm and the total film thickness was 20 nm (The thickness of both sides of the silica layer was 6 nm.). With respect to the metallic pigment used in the ink composition B, the average particle diameter D50 was 0.85 μm and the total film thickness was 10 nm. With respect to the metallic pigment used in the ink composition C, the average particle diameter D50 was 1.28 μm and the total film thickness was 50 nm (The thickness of both sides of the silica layer was 6 nm.). The thickness and the particle diameter were changed by changing the vapor deposition time and the pulverization time by ultrasonic waves, respectively.

Specifically, the particle diameter of the metallic pigment was determined by measuring the 50% average particle diameter R50 of the equivalent circle diameter determined from the area of the projected image of the metallic pigment particles using a flow type particle image analyzer (FPIA-3000S, manufactured by Sysmex Corp.). The thickness of the metallic pigment was measured by observing an ultrathin section of the cross section of the pigment particles using a scanning transmission electron microscope (STEM, "HD-2000" manufactured by Hitachi High-Technologies Corporation).

It was confirmed by the SEM observation that all the metallic pigment particles have a plate shape and the formation of the silica layer having an average thickness of 4 nm on the particle surface was confirmed by observing the ultrathin section of the cross section of the metallic pigment particles using a transmission electron microscope Tec nai G2f30 (manufactured by Philips).

2.1.2. Color Ink Composition

The following color ink composition was prepared. The composition was as follows:
  1,2-hexane diol: 10% by mass
  Urethane resin: 5% by mass
  Propylene glycol: 18% by mass
  2-pyrolidone: 5% by mass
  Olfine E1010 (manufactured by Nisshin Chemical Industry Co., Ltd.): 1% by mass
  Triethanol amine: 0.4% by mass
  Carbon black (Average particle diameter of 110 nm): 3% by mass.
Ion exchange water (balance) was added in such a manner as to have the composition, the mixture was mixed and stirred with a magnetic stirrer in a container for 2 hours, and then the mixture was filtered with a membrane filter with a pore size of 5 μm, thereby obtaining the color ink composition.

2.2. Formation of Image

2.2.1. Examples 1 to 12 and Comparative Examples 1 to 3

An ink cartridge in which each of the ink compositions shown in Table 1 was charged into a cartridge exclusive for an ink jet printer PX-G930 (manufactured by Seiko Epson Corp.) was produced. Next, each ink cartridge was placed in a yellow row of the ink jet printer PX-G930, and commercially-available ink cartridges were used for nozzles other than the yellow row. The commercially-available cartridges which were placed in the rows other than the yellow row were used as a dummy.

In Examples 1 to 8 and Comparative Examples 1 to 3, recorded matter on which a solid pattern image was printed was obtained by discharging the ink composition onto a photograph paper <Gloss> (manufactured by Seiko Epson Corp.) (PGPP). The duty when printing was as shown in Table 1, and was adjusted by changing the number of passes (Number of reciprocations of a serial head).

2.2.2. Examples 13 to 15

An ink cartridge in which the ink composition A was charged into a cartridge exclusive for an ink jet printer PX-G930 (manufactured by Seiko Epson Corp.) and an ink cartridge in which a color ink composition was charged into a cartridge exclusive for the printer were produced. Next, each ink cartridge of the ink composition A was placed in a yellow row of the ink jet printer PX-G930, each ink cartridge of the color ink composition was placed in a black row of the ink jet printer PX-G930, and commercially-available ink cartridges were used for nozzles other than the rows. The commercially-available cartridges which were placed in the rows other than the yellow row and the black row were used as a dummy. In Examples 13 to 15, the ink jet printer PX-G930 was converted in such a manner that the discharge frequency and the driving potential difference were able to be controlled and analyzed.

Then, by discharging the ink composition A onto a photograph paper <Gloss> (manufactured by Seiko Epson Corp.) (PGPP) under the conditions of the driving signals shown in Table 3, recorded matter on which a solid pattern image was printed was obtained.

TABLE 1

|  |  | Examples | | | | | | | | Comparative Examples | | |
|---|---|---|---|---|---|---|---|---|---|---|---|---|
|  |  | 1 | 2 | 3 | 4 | 5 | 6 | 7 | 8 | 1 | 2 | 3 |
| Ink composition type | A | ◯ | ◯ | ◯ | ◯ | ◯ |  |  |  | ◯ |  |  |
|  | B |  |  |  |  |  | ◯ | ◯ |  |  | ◯ |  |
|  | C |  |  |  |  |  |  |  | ◯ |  |  | ◯ |
| content concentration of metallic pigment (% by mass) |  | 1.5 | 1.5 | 1.5 | 1 | 2 | 1 | 2 | 1.5 | 1.5 | 2 | 1.5 |
| duty (%) |  | 40 | 100 | 150 | 40 | 150 | 40 | 150 | 100 | 20 | 180 | 40 |
| Coverage (%) |  | 92 | 100 | 100 | 92 | 100 | 91 | 100 | 100 | 64 | 100 | 91 |
| Average lamination number |  | 4 | 8 | 14 | 3 | 19 | 4 | 30 | 7 | 2 | 37 | 2 |
| Film thickness of metallic image (μm) |  | 0.14 | 0.29 | 0.49 | 0.10 | 0.65 | 0.08 | 1.06 | 0.53 | 0.08 | 0.67 | 0.06 |
| 60° gloss (—) |  | 324 | 378 | 332 | 297 | 292 | 259 | 265 | 359 | 200 | 237 | 245 |

With respect to Examples 9 to 12, by discharging the "ink composition A" onto a photograph paper <Gloss> (manufactured by Seiko Epson Corp.) (PGPP) or a polyvinyl chloride film (manufactured by Sumitomo 3M, Ltd.: IJ180), recorded matter on which a solid pattern image was printed was obtained. The number of passes when printing was as shown in Table 2, and the total amount of the ink composition A which was made to adhere to the recording medium was not dependent on the number of passes and was fixed. When performing recording on the polyvinyl chloride film, the recording was performed by heating a platen of the printer to 50° C., and, also after the recording, the recorded matter was sufficiently heated.

TABLE 2

|  |  | Examples | | | |
|---|---|---|---|---|---|
|  |  | 9 | 10 | 11 | 12 |
| Recording medium | PGPP | ◯ |  | ◯ |  |
|  | IJ180 (heating) |  | ◯ |  | ◯ |
| Number of passes |  | 1 | 1 | 2 | 2 |
| Gloss |  | 342 | 267 | 317 | 294 |

TABLE 3

|  |  | Examples | | |
|---|---|---|---|---|
|  |  | 13 | 14 | 15 |
| Ink composition (metallic) | Discharge frequency (kHz) | 5 | 10 | 5 |
|  | Driving potential difference (V) | 30 | 40 | 40 |
|  | Flying speed of liquid droplets (m/s) | 5 | 7 | 7 |
| Ink composition (black) | Discharge frequency (kHz) | 20 | 20 | 20 |
|  | Driving potential difference (V) | 30 | 30 | 30 |
|  | Flying speed of liquid droplets (m/s) | 8 | 8 | 8 |
| Discharge stability |  | ◯ | X | ◯ |
| Mass difference of liquid droplets |  | X | ◯ | ◯ |

2.3. Measurement of Average Lamination Number of and Image Film Thickness

Recorded matter obtained in each of Examples 1 to 8 and Comparative Examples 1 to 3 was trimmed in such a manner as to include the metallic image portion, and then introduced into a FIB (Focused Ion Beam) device (manufactured by FEI, Inc., FB200) to thereby expose the cross section of the metallic image to have a width of 100 μm. Next, the exposed cross section was observed under a SEM. In the SEM image, 20 counting portions were determined with an interval of 5 μm in the cross section of the metallic image, and then the number of the laminated metallic pigments in each portion was counted. Next, the average lamination number was determined, and a value obtained by rounding the average lamination number to the closest whole number was shown in Table 1. Moreover, the thickness of the entire metallic image in each counting portion was measured by SEM, and the average value thereof was shown in Table 1.

2.4. Evaluation of Coverage

By observing a 1 cm square region of the solid portion of the recorded matter obtained in each of Examples 1 to 8 and Comparative Examples 1 to 3 under an optical microscope, and performing image processing to thereby calculate the coverage. The results were shown in Table 1.

2.5. Evaluation of Gloss

The metallic image obtained in each of Examples 1 to 12 and Comparative Examples 1 to 3 was measured for the 60° gloss using a gloss meter MULTI Gloss 268 (manufactured by Konica Minolta Co., Ltd.). The obtained values were shown in Table 1 or 2. When the gloss value is 250 or more, good metallic feeling was obtained also when visually observed.

2.6. Discharge Stability

The solid image portion obtained in each of Examples 9 to 11 was observed under an optical microscope. Then, the case where omission (portion to which the ink composition A did not adhere) did not occur in the image was evaluated as ◯ and the case where the omission occurred was evaluated as X. The results were shown in Table 3. Herein, when the omission occurred in the image, it is estimated that the discharge was not perfect or curved flight occurred when the ink composition A was discharged from nozzles, which shows that the discharge stability is insufficient.

2.7. Measurement of Flying Speed of Liquid Droplets

In Examples 13 to 15, the ink jet printer PX-G930 was dissembled so that the vicinity of the nozzle of the recording head was able to be observed. Then, the ink composition A and the color ink composition were discharged under the conditions shown in Table 3. The state was taken by a high speed camera (10000 images/s). Then, the results of determining the flying speed immediately after the discharge of the first liquid droplet of each ink composition are shown in Table 3.

2.8. Measurement of Liquid Droplet Amount

In Examples 13 to 15, the mass per liquid droplet of the ink composition and the color ink composition was separately determined as follows. More specifically, the liquid droplet was discharged 10 times for each time from a nozzle, and then the ink mass was measured by a precision balance and divided by the total number of times of discharge (Product of the number of times of discharge for each nozzle and the number of nozzles) of the ink droplets, thereby calculating the average ink droplet mass. Then, the case where the difference between the liquid droplet mass of the ink composition and the liquid droplet mass of the color ink composition was 4 ng or less was evaluated as ◯ and the case where the difference was not so was evaluated as x. The results were shown in Table 3.

2.9. Evaluation Results

In all the ink compositions A, B, and C, the average particle diameter of the metallic pigments is 0.5 μm or more and 2 μm or less and the total film thickness is 10 nm or more and 50 nm or less. However, according to the results of Table 1, it was found that, in Examples 1 to 8 in which the average number of the laminated metallic pigment particles in the metallic image is 3 or more and 30 or less, the gloss of the metallic images is more excellent than those of Comparative Examples 1 to 3 in which the average lamination number was not in this range. Moreover, according to Table 1, it is found that when the coverage is 90% or more, sufficiently high gloss can be obtained.

The results of Table 2 showed that when Example 9 and Example 11 using ink-absorbing recording media are compared, one (Example 9) in which the image was formed by one pass has more excellent gloss than one (Example 11) in which the image was formed by two passes even when the adhesion amounts are the same. This is considered to show that it is effective for obtaining better gloss in the case of absorbing recording media to reduce the number of passes in recording in a serial type ink jet recording device or to perform recording by a line type ink jet recording device.

On the other hand, the results of Table 2 show that when Example 10 and Example 12 an ink non-absorbing recording media are compared, one (Example 12) in which the image was formed by two passes has more excellent gloss than one (Example 10) in which the image was formed by one pass even when the adhesion amounts are the same. This is considered to show that it is effective for obtaining better gloss in the case of non-absorbing recording media to increase the number of passes in recording in a serial type ink jet recording device.

According to the results of Table 3, it is found that, in all Examples 13 to 15 in which the discharge frequency of the recording head when recording the metallic image is less than the discharge frequency of the recording head when recording the color image, the images with high gloss are obtained. Moreover, according to the results of Table 3, when the discharge frequency of the recording head when recording the metallic image is close to the discharge frequency of the recording head when recording the color image, the discharge stability tends to decrease.

Furthermore, the results of Table 3 show that when the driving potential difference of the recording head when recording the metallic image is higher than the driving potential difference of the recording head when recording the color image (Examples 14 and 15), the mass difference of the liquid droplets can be made small, and the gloss tends to increase. This phenomenon is considered to relate to the fact that, since the mass difference of the liquid droplets is small, irregularities can be made small on the surface of the image after adhering to the recording medium.

Moreover, the result of Table 3 show that when the driving potential difference of the recording head when recording the metallic image is higher than the driving potential difference of the recording head when recording the color image (Examples 14 and 15) and the difference between the flying speed (m/s) of the first liquid droplet of the ink composition when recording the metallic image higher and the flying speed (m/s) of the first liquid droplet of the color ink composition when recording the color image is less than 2, the mass difference of the liquid droplets can be made small and the gloss tends to increase (Examples 14 and 15). This phenomenon is considered to relate to the fact that since the mass difference of liquid droplets is small, irregularities can be made small on the surface of the image after adhering to the recording medium.

The aspects of the invention are not limited to the embodiments described above, and various modifications are possible. For example, the aspects of the invention include essentially the same configurations as the configurations described in the embodiments (for example, a configuration in which the functions, methods, and results are the same, or a configuration in which the objects and the effects are the same). Further, the aspects of the invention also include configurations in which non-essential portions of the configurations described in the embodiments are substituted. Further, the aspects of the invention include configurations demonstrating the same operation effects or configurations achieving the same objects as the configurations described in the embodiments. Further, the aspects of the invention include configurations in which common technologies are added to the configurations described in the embodiments.

What is claimed is:

1. An ink jet recording method, comprising:
   discharging an ink composition containing a metallic pigment to a recording medium using a recording head, and then recording a metallic image in a recording region of the recording medium,
   particles of the metallic pigment having a plate shape and having a coating layer on the surface, an average particle diameter in the ink composition being 0.5 µm or more and 2 µm or less, a total film thickness including the coating layer being 10 nm or more and 50 nm or less, and
   an average number of the laminated metallic pigment particles in the metallic image being 3 or more and 30 or less, wherein
   a coverage of the metallic image to the recording region on the recording medium is 90% or more.

2. The ink jet recording method according to claim 1, wherein
   the recording head is a serial type head, a recording resolution of the metallic image in a main scanning direction of the recording head is less than or equal to two times a head resolution of the recording head, and
   the recording medium is a low absorbing or non-absorbing recording medium.

3. The ink jet recording method according to claim 1, wherein
   the recording head is a line type head, and
   the recording medium is an absorbing recording medium.

4. An ink jet recording method, comprising:
   discharging an ink composition containing a metallic pigment to a recording medium using a recording head, and then recording a metallic image in a recording region of the recording medium;
   particles of the metallic pigment having a plate shape and having a coating layer on the surface, an average particle diameter in the ink composition being 0.5 µm or more and 2 µm or less, a total film thickness including the coating layer being 10 nm or more and 50 nm or less; and
   an average number of the laminated metallic pigment particles in the metallic image being 3 or more and 30 or less, wherein
   a film thickness of the coating layer is 0.5 nm or more and 15 nm or less.

5. The ink jet recording method according to claim 4, wherein
   the recording head is a serial type head, a recording resolution of the metallic image in a main scanning direction of the recording head is less than or equal to two times a head resolution of the recording head, and
   the recording medium is a low absorbing or non-absorbing recording medium.

6. The ink jet recording method according to claim 4, wherein
   the recording head is a line type head, and
   the recording medium is an absorbing recording medium.

7. An ink jet recording method, comprising:
   discharging an ink composition containing a metallic pigment to a recording medium using a recording head, and then recording a metallic image in a recording region of the recording medium;
   particles of the metallic pigment having a plate shape and having a coating layer on the surface, an average particle diameter in the ink composition being 0.5 µm or more and 2 µm or less, a total film thickness including the coating layer being 10 nm or more and 50 nm or less; and
   an average number of the laminated metallic pigment particles in the metallic image being 3 or more and 30 or less, wherein
   the method further includes discharging a color ink composition containing a color coloring material to the recording medium using a recording head, and then recording a color image,
   a discharge frequency of the recording head when recording the metallic image being less than a discharge frequency of the recording head when recording the color image.

8. The ink jet recording method according to claim 7, wherein
   a difference between a flying speed (m/s) of a first liquid droplet of the ink composition when recording the metallic image and a flying speed (m/s) of a first liquid droplet of the color ink composition when recording the color image is less than 4.

9. The ink jet recording method according to claim 7, wherein
   the recording head is a serial type head, a recording resolution of the metallic image in a main scanning direction of the recording head is less than or equal to two times a head resolution of the recording head, and
   the recording medium is a low absorbing or non-absorbing recording medium.

10. The ink jet recording method according to claim 7, wherein
    the recording head is a line type head, and
    the recording medium is an absorbing recording medium.

11. An ink jet recording method, comprising:
    discharging an ink composition containing a metallic pigment to a recording medium using a recording head, and then recording a metallic image in a recording region of the recording medium;
    particles of the metallic pigment having a plate shape and having a coating layer on the surface, an average particle diameter in the ink composition being 0.5 µm or more and 2 µm or less, a total film thickness including the coating layer being 10 nm or more and 50 nm or less; and
    an average number of the laminated metallic pigment particles in the metallic image being 3 or more and 30 or less, wherein
    the method further includes discharging a color ink composition containing a color coloring material to the recording medium using a recording head, and then recording a color image,
    a driving potential difference of the recording head when recording the metallic image being higher than a driving potential difference of the recording head when recording the color image.

* * * * *